United States Patent Office 2,875,219
Patented Feb. 24, 1959

2,875,219
BITUMINOUS BONDING AGENTS

Clarence F. Huber, Mount Healthy, and Paul F. Thompson, Deer Park, Ohio, assignors to The Cincinnati Milling Machine Company, Cincinnati, Ohio, a corporation of Ohio No Drawing. Application March 15, 1955
Serial No. 494,568

11 Claims. (Cl. 260—404.5)

This invention relates to bituminous compositions of the type that are mixed with mineral aggregates in the construction of asphalt pavements. More particularly the invention relates to a novel group of bonding agents which are adapted to be incorporated in such bituminous compositions and when so incorporated not only improve the bonding effectiveness of the bituminous composition but also exhibit improved thermal stability as compared with the bonding agents previously used.

It is known in the art of manufacturing bituminous compositions that the coating and bonding qualities of such compositions when mixed with mineral aggregates in the construction of asphalt pavements can be improved by addition thereto of certain chemical agents. The use of these agents has made it possible to use wet aggregates in preparing paving mixtures, thus making it unnecessary to have dry aggregates available and eliminating delays in road construction. Also the incorporation of such bonding agents in bituminous paving compositions has made it possible to use hydrophilic aggregates which could not be otherwise used. Moreover the use of these chemical bonding agents has brought about an improvement in the structural stability of the finished bituminous pavement by decreasing the tendency of the aggregate and bitumen to separate when exposed to water. Thus these agents have been useful in improving the method of asphalt road construction and improving the quality and length of service of the finished pavement.

However, in general these previously proposed bonding agents have been subject to the deficiency that they do not remain stable at elevated temperatures. In many instances it is common practice to store bituminous compositions after they have been prepared in tanks at an elevated temperature of say 250–400° F. and maintain it in a fluid state so that the composition can be readily removed without the re-heating that would be necessary if the composition were allowed to cool and solidify. The period of storage may be as long as 14 days. In other cases quantities of asphalt or light bitumen are heated as high as 400°–500° F. at the time of shipment so that the temperature upon arrival at the point of destination will have dropped to about 300°–350° F., which is the desirable temperature required for proper application in preparing the paving mixture.

In general the previously proposed bonding agents are incapable of withstanding such elevated temperatures; when subjected to such temperatures they rapidly lose their effectiveness and become of little value as bonding agents. Accordingly it is an object of the present invention to provide a novel group of compounds which are adapted to be incorporated in bituminous paving compositions to improve the coating properties of the composition for wet aggregates and which retain their bonding effectiveness when subjected to the elevated temperatures encountered during the storage and handling of asphalt compositions.

In accordance with the present invention the foregoing objective is achieved by incorporating in bituminous compositions one or more compounds selected from the class of amides of N, N-bis(aminoalkyl) N-alkylamines and their salts. It has been found that when small amounts of such compounds are incorporated in a bituminous composition, the coating and bonding properties of the composition for wet aggregates is substantially improved and this improvement is retained even when the bituminous composition is maintained at elevated temperatures for extended periods of time.

The amides and amide salts of the present invention include the five classes indicated below:

(1) Mono-amides having the general formula:

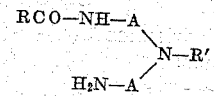

wherein RCO is an acyl group derived from an organic acid having from 10–20 carbon atoms, A is an aliphatic hydrocarbon group having from 2–6 carbon atoms, and R' is an aliphatic hydrocarbon radical having from 1–10 carbon atoms. In this formula the two A groups may have different numbers of carbon atoms.

(2) Di-amides having the general formula:

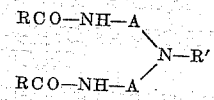

wherein RCO is an acyl group derived from an organic acid having from 2–20 carbon atoms and A and R' have the same definition as in Formula 1. In this formula the two RCO groups may be different and at least one RCO group should be derived from acid containing 10–20 carbon atoms.

(3) A di-amide-mono-salt having the general formula:

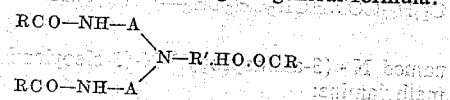

wherein RCO is an acyl group derived from an organic acid having 2–20 carbon atoms; A and R' are defined as in Formula 1; the RCO group of the salt-forming acid and at least one of the other RCO groups is derived from an acid having 10–20 carbon atoms; and the several RCO groups may be derived from different acids.

(4) A mono-amide-mono-salt having the general formula:

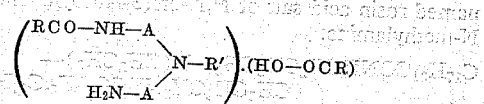

wherein RCO is an acyl group derived from an acid having 10–20 carbon atoms; A and R' are defined as in Formula 1; and the two RCO groups may be different.

(5) A mono-amide-disalt having the general formula:

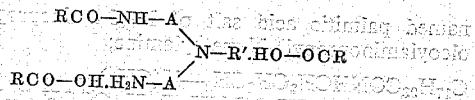

wherein RCO is an acyl group derived from an acid having 2–20 carbon atoms; A and R' have the same definitions as in Formula 1; the RCO group of the amide-forming group and at least one of the other RCO groups is derived from an acid containing from 10–20 carbon atoms; and the several RCO groups may be different.

Typical compounds that come within the scope of the foregoing general formulae and are useful in accordance with the present invention are:

$CH_2CH_2CH_2NHCOC_{17}H_{33}$ named N,N-bis(3-oleoylaminopropyl)-N-methylamine;

$C_{11}H_{23}CONHCH_2CH_2CH_2—N(CH_3)—$
$\phantom{C_{11}H_{23}CONHCH_2CH_2CH_2—}CH_2CH_2CH_2NHCOC_{11}H_{23}$ named N,N-bis(3-lauroylaminopropyl)-N-methylamine;

$C_{15}H_{31}CONHCH_2CH_2CH_2—N—(CH_3)—$
$\phantom{C_{15}H_{31}CONHCH_2CH_2CH_2—}CH_2CH_2CH_2NHCOC_{15}H_{31}$ named N,N-bis(3-palmitoylaminopropyl)-N-methylamine;

$C_{17}H_{33}CONHCH_2CH_2CH_2—N(CH_2CH_2CH_2CH_3)—$
$\phantom{C_{17}H_{33}CONHCH_2CH_2CH_2—}CH_2CH_2CH_2NHCOC_{17}H_{33}$ named N,N-bis(3-oleoylaminopropyl)-N-butylamine;

$C_{17}H_{31}CONHCH_2CH_2—N(CH_2CH_3)—$
$\phantom{C_{17}H_{31}CONHCH_2CH_2—}CH_2CH_2CH_2NHCOC_{17}H_{31}$ named N-(2-linoleoylaminoethyl)-N-(3-linoleoylaminopropyl)-N-ethylamine;

$C_{15}H_{31}CONHCH_2CH_2—N(CH_3)—$
$\phantom{C_{15}H_{31}CONHCH_2CH_2—}CH(CH_3)CH_2NHCOC_{15}H_{31}$ named N-(2-palmitoylaminoethyl)-N-(2-palmitoylaminoisopropyl)-N-methylamine;

$C_{17}H_{33}CONH—(CH_2)_6—N(CH_3)—$
$\phantom{C_{17}H_{33}CONH—(CH_2)_6—}(CH_2)_6—NHCOC_{17}H_{33}$ named N,N-bis(6-oleoylaminohexyl)-N-methylamine;

$C_{17}H_{33}CONHCH_2CH_2CH_2—N(CH_3)—$
$\phantom{C_{17}H_{33}CONHCH_2CH_2CH_2—}CH_2CH_2CH_2NHCOC_3H_7$ named N-(3-butyrylaminopropyl)-N-(3-oleoylaminopropyl)-N-methylamine;

$C_{17}H_{31}CONHCH_2CH_2CH_2—N(CH_3)—$
$\phantom{C_{17}H_{31}CONHCH_2CH_2CH_2—}CH_2CH_2CH_2NHCOCH_3$ named N-(3-acetamidopropyl)-N-(3-linoleoylaminopropyl)-N-methylamine;

$C_{17}H_{33}CONHCH_2CH_2CH_2—N(CH_3)—$
$\phantom{C_{17}H_{33}CONHCH_2CH_2CH_2—}CH_2CH_2CH_2NH_2$ named N-(3-aminopropyl)-N-(3-oleoylaminopropyl)-N-methylamine;

$C_{17}H_{33}CONHCH_2CH_2CH_2—N(CH_3)—$
$\phantom{C_{17}H_{33}CONHCH_2CH_2CH_2—}CH_2CH_2CH_2NHCOC_{17}H_{33}.C_{17}H_{31}COOH$ named linoleic acid salt of N,N-bis(3-oleoylaminopropyl)-N-methylamine;

$C_{11}C_{23}CONHCH_2CH_2CH_2—N(CH_3)—$
$\phantom{C_{11}C_{23}CONHCH_2CH_2CH_2—}CH_2CH_2CH_2NHCOC_{11}H_{23}.RCOOH$ named rosin acid salt of N,N-bis(3-lauroylaminopropyl)-N-methylamine;

$C_{17}H_{31}CONHCH_2CH_2CH_2—N(CH_2CH_3)—$
$\phantom{C_{17}H_{31}CONHCH_2CH_2CH_2—}CH_2CH_2CH_2NHCOOH_3.C_{17}H_{33}COOH$ named oleic acid salt of N-(3-acetamidopropyl)-N-(3-linoleoylaminopropyl)-N-ethylamine;

$C_{17}H_{33}CONHCH_2CH_2CH_2—N(CH_3)—$
$\phantom{C_{17}H_{33}CONHCH_2CH_2CH_2—}CH_2CH_2CH_2NH_2.C_{15}H_{31}COOH$ named palmitic acid salt of N-(3-aminopropyl)-N-(3-oleoylaminopropyl)-N-methylamine;

$C_{17}H_{33}CONHCH_2CH_2CH_2—N(CH_3)—$
$\phantom{C_{17}H_{33}CONHCH_2CH_2CH_2—}CH_2CH_2CH_2NH_2.C_{17}H_{33}COOH.C_{17}H_{31}COOH$ named mixed stearic and linoleic acid salt of N-(3-aminopropyl)-N-(3-oleoylaminopropyl)-N-methylamine.

In preparing the amides and amide salts of the present invention, organic acids are reacted with di(aminoalkyl) alkylamines. Representative amines of this class that may be used are:

$H_2N—CH_2CH_2CH_2—N(CH_3)—CH_2CH_2CH_2—NH_2$ named N,N-bis(3-aminopropyl)-N-methylamine;

$H_2N—CH_2CH_2CH_2—N(CH_2CH_2CH_2CH_3)—$
$\phantom{H_2N—CH_2CH_2CH_2—}CH_2CH_2CH_2—NH_2$ named N,N-bis(3-aminopropyl)-N-butylamine;

$H_2N—CH_2CH_2—N(CH_2CH_3)—CH_2CH_2CH_2—NH_2$ named N-(2-aminoethyl)-N-(3-aminopropyl)-N-ethylamine;

$H_2N—CH_2—CH_2—N(CH_3)—CH(CH_3)—CH_2NH_2$ named N-(2-aminoethyl)-N-(2-aminoisopropyl)-N-methylamine;

$H_2N—CH_2CH_2CH_2CH_2CH_2CH_2—N(CH_3)—$
$\phantom{H_2N—CH_2CH_2CH_2CH_2CH_2CH_2—}CH_2CH_2CH_2CH_2CH_2CH_2NH_2$ named N,N-bis-(6-aminohexyl)-N-methylamine.

As pointed out above, the acyl group of the salt-forming acid and at least one of the amide-forming acyl groups should be derived from an organic acid having 10–20 carbon atoms and representative acids of this group that may be used are: oleic, linoleic, linolenic, lauric, palmitic, stearic, rosin acid, abietic acids, naphthenic acids, tall oil acids, or any acids derived from tall oils as well as mixtures of the foregoing acids. In cases where the present compounds contain more than one amide-forming acyl group, including at least one acyl group derived from an acid having 10–20 carbon atoms, the other acyl groups of the compound may be derived from acids containing fewer than 10 carbon atoms. Representative acids of this group are: acetic, butyric, 2-ethyl-hexanoic, hexoic, caprylic, caproic, toluic, benzoic and 2-ethyl-butyric acids.

In preparing the amido-amines of the present invention a (aminoalkyl) alkylamine is mixed with a suitable organic acid, acyl halide, acid anhydride or ester and heated at 100–200° C. with agitation. The reaction with an organic acid may be considered as taking place in two stages; upon mixing, the amine salt of the organic acid is formed and during the heating process the salt is de-hydrated with the elimination of 1 mol of water for each amide group. The methods of making compounds of the type represented by Formulae 1–5 are indicated below.

To make the compounds of Formula 1 equimolar quantities of acid and amine are mixed to form an amine salt which is heated to convert the amine salt to an amide according to the following equations:

$NH_2—A—N(R')—A—NH_2 + RCOOH \rightarrow$
$\phantom{NH_2—A—N(R')—A—NH_2 +}RCOOH.NH_2—A—N(R')—A—NH_2$ $RCOOH.NH_2—A—N(R')—A—NH_2 \rightarrow$
$\phantom{RCOOH.NH_2—A—}RCO—NH—A—N(R')—A—NH_2 + H_2O$ The compounds of Formulae 2 and 3 may be prepared in the same way as Formula 1 except that two and three mols of acid respectively per mol of amine are used.

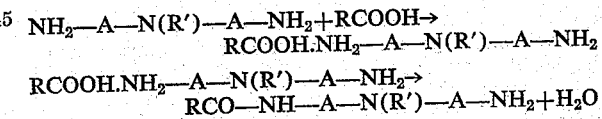

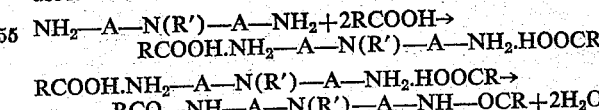

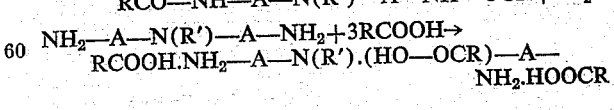

In preparing the compounds of Formula 4 equimolar quantities of acid and amine are mixed and heated to form an amide and then a second mol of acid is mixed with the amide to form the salt.

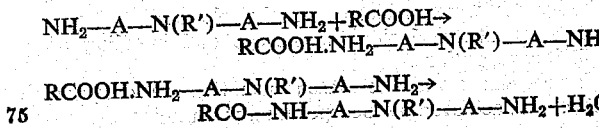

The compounds of Formula 5 can be made by mixing three mols of acid with the amine and heating only to the extent necessary to remove one mol of water.

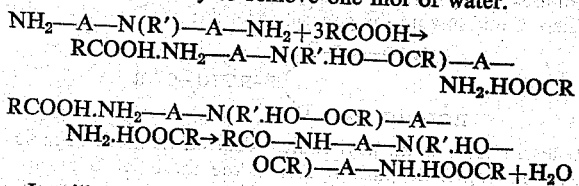

It will be evident that in the case of compounds of Formulae 2 and 3, the compounds can be prepared by the addition of one mol of acid at a time. Also where the several acyl groups of the compounds are derived from different acids, stepwise amidation should be used.

In order to point out more fully the nature of the present invention the following specific examples are given of illustrative methods of making certain of the present compounds:

Example I

Two mols of oleic acid were mixed with one mol of N,N-bis(3-aminopropyl)-N-methylamine and heated with agitation to 150° C. The mixture was heated at this temperature with agitation for about six hours during which time approximately two mols of water was removed by distillation. The resulting product N,N-bis(3-oleoylaminopropyl)-N-methylamine was found to be a particularly effective additive. The diamide was further reacted with a mol of oleic acid by mixing at room temperature to form a salt which was also an effective additive. It will be evident that the salt can also be formed by initially mixing 3 mols of oleic acid with one mol of the amine and heating.

Example II

A mixture of one mol of N,N-bis(3-aminopropyl)-N-ethylamine and two moles of oleic acid was heated to 150° C. with agitation. The mixture was agitated at 150° C. for six hours, during which time approximately two mols of water was removed by distillation. The resulting product, mainly N,N-bis(3-oleoylaminopropyl)-N-ethyl-amine, was thermally stable in asphalt and was an effective bonding agent.

Example III

Two mols of palmitic acid were reacted with one mol of N,N-bis(3-aminopropyl)-N-ethyl-amine as in Example II. The product was mixed with one mol of oleic acid. The resulting oleic acid salt of N,N-bis(3-palmitoylamino)-N-ethyl-amine was thermally stable in asphalt and was an effective bonding agent.

Example IV

To 10 mols of N,N-bis(3-aminopropyl)-N-methylamine was added 1 mol of oleyl chloride, dropwise, with good agitation. The precipitate of hydrochlorides was removed by filtration. The resulting filtrate was evaporated in vacuum, leaving a residue of N-(3-oleoylaminopropyl)-N-(3-aminopropyl)-N-methyl-amine. The product was thermally stable in asphalt and was an effective bonding agent.

Example V

One mol of oleic acid was mixed at room temperature with one mol of N-(3-oleoylaminopropyl)-N-(3-aminopropyl)-N-methyl-amine, which was prepared according to Example IV. The resulting oleic acid salt of the amidoamine was an effective agent for bonding asphalt to wet aggregate and was thermally stable in asphalt.

Example VI

One mol of linoleic acid was mixed with one mol of the compound prepared as in Example V. The product was a mixture of the oleic and linoleic acid salts of N-(3-oleoylaminopropyl)-N-(3-aminopropyl)-N-methyl-amine and was an effective agent for bonding asphalt to wet aggregate, and the agent was thermally stable in asphalt.

Example VII

One mol of N-(3-oleoylaminopropyl)-N-(3-aminopropyl)-N-methyl-amine, which was prepared according to Example IV, was added slowly to a solution of one mol of acetic anhydride in three mols of dry benzene at 50° C. The resulting solution was evaporated in vacuum, leaving a residue of N-(3-acetamidoproyl)-N-(3-oleoylaminopropyl)-N-methyl-amine. This product was thermally stable in asphalt and was an effective bonding agent.

Example VIII

One mol of N-(3-acetamidopropyl)-N-(3-oleoylaminopropyl)-N-methyl-amine, prepared according to Example VII, was mixed with one mol of oleic acid at room temperature to form the oleic acid salt of the amine. The product was thermally stable in asphalt and was an effective bonding agent.

Example IX

Two moles of methyl oleate was mixed with one mol of N,N-bis(2-aminoethyl)-N-butyl-amine, and the mixture was stirred and heated under reflux at 150° C. for four hours. The material was then distilled at a stillpot temperature of 150° C., until approximately two mols of methanol had been removed by distillation. The residual product, N,N-bis(2-oleoylaminoethyl)-N-butyl-amine, was thermally stable in asphalt and was an effective bonding agent.

Example X

One mol of material prepared as in Example IV was mixed with 2 mols of palmitic acid and heated to 150° C. for six hours. The resulting palmitic acid salt of N-(3-oleoylaminopropyl) - N - (3-palmitoylaminopropyl)-N-methyl-amine was thermally stable in asphalt and was an effective agent for bonding asphalt to wet aggregate.

Example XI

A mixture of two mols of palmitic acid and one mol of N-(6-aminohexyl)-N-(2-aminoisopropyl)-N-methyl-amine was heated at 150° C. for six hours. Approximately two mols of water was removed by distillation during this time. The product was mainly N-(6-palmitoylaminohexyl)-N-(2 - palmitoylaminoisopropyl)-N-methyl-amine. The product was thermally stable in asphalt and was an effective agent for bonding asphalt to wet aggregate.

It has been found that when suitable quantities of the foregoing compounds, usually 0.1 to 5% by weight, are incorporated in asphalt they confer on the asphalt the ability to effectively coat wet aggregates and the improved coating and bonding properties of the asphalt are retained even when it is maintained at elevated temperatures for extended periods of time. In fact it has been found that the effectiveness of the present compounds is sometimes enhanced by heating in asphalt, possibly due to the fact that compounds such as those represented by Formulae 1, 2 and 4 are capable of reacting with further quantities of acid and may react with the naphthenic acids present in the asphalt.

It is of course to be understood that the foregoing examples are illustrative only and that numerous amidoamines and salts other than those specifically referred to fall within the scope of the general formulae given above and can be incorporated in asphalt to achieve the advantages outlined at the beginning of the present specification.

We claim:

1. Compounds adapted to be incorporated in bituminous compositions to improve the coating properties thereof, said compounds being amides of N, N-di(aminoalkyl)-N-alkyl amines and salts of such amides, the amide-forming acids being organic acids having from 2 to 20 carbon atoms and the salt-forming acids, if present, and at least one of the amide-forming acids having from 10 to 20 carbon atoms.

2. Compounds adapted to be incorporated in bituminous compositions to improve the coating properties thereof and having the general formula:

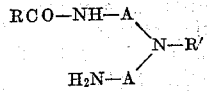

wherein RCO is an acyl group derived from an organic acid having 10–20 carbon atoms; A is an aliphatic hydrocarbon radical containing 2–6 carbon atoms and the two A groups may be different; and R' is an aliphatic hydrocarbon group containing 1–10 carbon atoms.

3. Compounds adapted to be incorporated in bituminous compositions to improve the coating properties thereof and having the general formula:

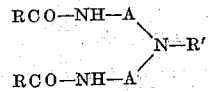

wherein RCO is an acyl group derived from an organic acid having 2 to 20 carbon atoms, the two RCO groups may be different, and at least one of the RCO groups is derived from an organic acid having 10–20 carbon atoms; A is an aliphatic hydrocarbon group containing 2–6 carbon atoms and the two A groups may be different; and R' is an aliphatic hydrocarbon radical containing 1–10 carbon atoms.

4. Compounds adapted to be incorporated in bituminous compositions to improve the coating properties thereof and having the general formula:

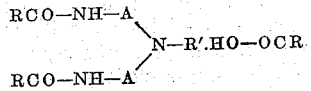

wherein RCO is an acyl radical derived from an organic acid having 2–20 carbon atoms, the three RCO groups may be different, and the RCO group of the salt-forming acid and at least one of the amide-forming RCO groups contains 10–20 carbon atoms; A is an aliphatic hydrocarbon radical containing 2–6 carbon atoms and the two A groups may be different; and R' is an aliphatic hydrocarbon radical containing from 1–10 carbon atoms.

5. Compounds adapted to be incorporated in bituminous compositions to improve the coating properties thereof and having the general formula:

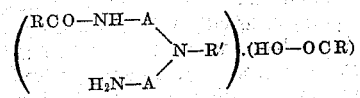

wherein RCO is an acyl radical derived from an organic acid having 10–20 carbon atoms and the two RCO groups may be different; A is an aliphatic hydrocarbon radical containing from 2–6 carbon atoms and the two A groups may be different; and R' is an aliphatic hydrocarbon radical containing 1–10 carbon atoms.

6. Compounds adapted to be incorporated in bituminous compositions to improve the coating properties thereof and having the general formula:

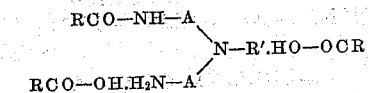

wherein RCO is an acyl radical derived from an organic acid having 2–20 carbon atoms, the three RCO groups may be different, and the RCO group of the amide-forming group and at least one of the two RCO groups of the salt-forming acid contains 10–20 carbon atoms; A is an aliphatic hydrocarbon radical containing 2–6 carbon atoms and the two A groups may be different; and R' is an aliphatic hydrocarbon radical containing 1–10 carbon atoms.

7. A compound adapted to be incorporated in bituminous compositions to improve the coating properties thereof, said compound being N,N-bis(3-oleoylaminopropyl)-N-ethyl-amine.

8. A compound adapted to be incorporated in bituminous compositions to improve the coating properties thereof, said compound being N-(3-oleoylaminopropyl)-N-(3-aminopropyl)-N-methyl-amine.

9. A compound adapted to be incorporated in bituminous compositions to improve the coating properties thereof, said compound being the oleic acid salt of N-(3-oleoylaminopropyl)-N-(3-aminopropyl)-N-methyl-amine.

10. A compound adapted to be incorporated in bituminous compositions to improve the coating properties thereof, said compound being N-(3-acetamidopropyl)-N-(3-oleoylaminopropyl)-N-methyl-amine.

11. A compound adapted to be incorporated in bituminous compositions to improve the coating properties thereof, said compound being N,N-bis(2-oleoylaminoethyl-N-butyl amine.

References Cited in the file of this patent

UNITED STATES PATENTS

| | | |
|---|---|---|
| 2,407,703 | Kaplan | Sept. 17, 1946 |
| 2,419,404 | Johnson | Apr. 22, 1947 |
| 2,426,220 | Johnson | Aug. 26, 1947 |
| 2,438,318 | Johnson | Mar. 23, 1948 |
| 2,489,473 | Zerner | Nov. 29, 1949 |
| 2,514,954 | Johnson | July 11, 1950 |
| 2,538,929 | Zinzalian | Jan. 23, 1951 |
| 2,540,678 | Kelley | Feb. 6, 1951 |
| 2,614,980 | Lytle | Oct. 21, 1952 |
| 2,663,648 | Jelling | Dec. 22, 1953 |

FOREIGN PATENTS

| | | |
|---|---|---|
| 917,517 | France | Jan. 9, 1947 |
| 917,518 | France | Jan. 9, 1947 |
| 971,023 | France | Jan. 11, 1951 |